June 28, 1938.　　　F. C. CHEW　　　2,121,858
EXCAVATING AND PROSPECTING TOOL
Filed Sept. 9, 1937　　　2 Sheets-Sheet 1
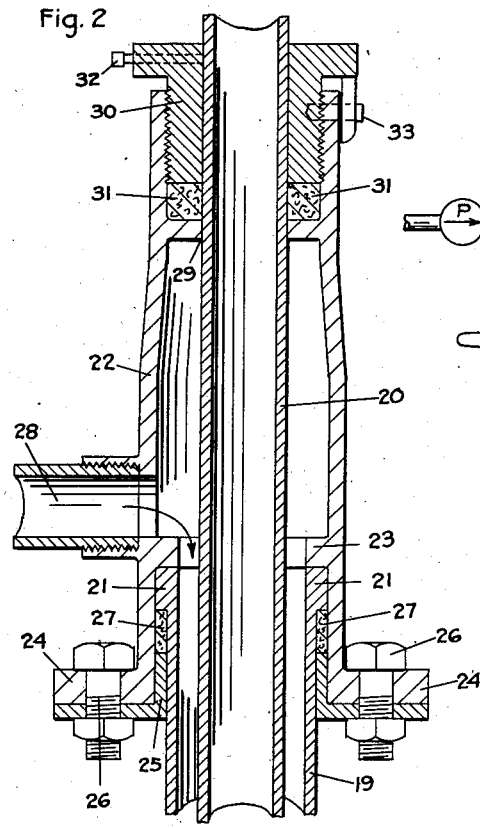
Fig. 2
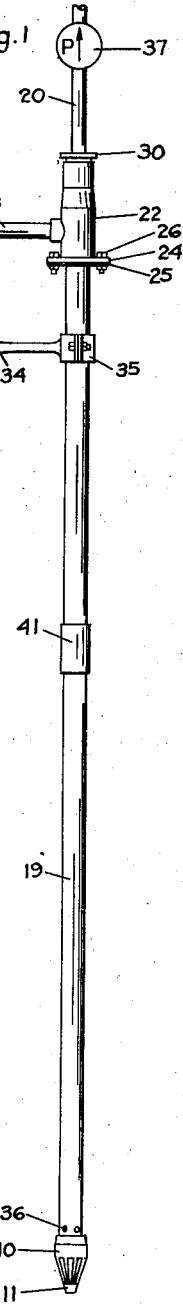
Fig. 1
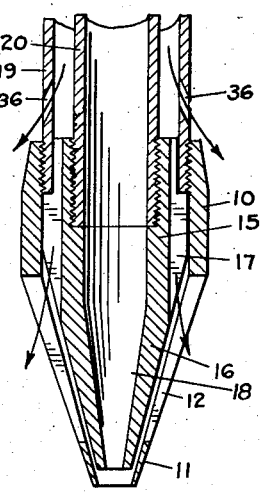
Fig. 3
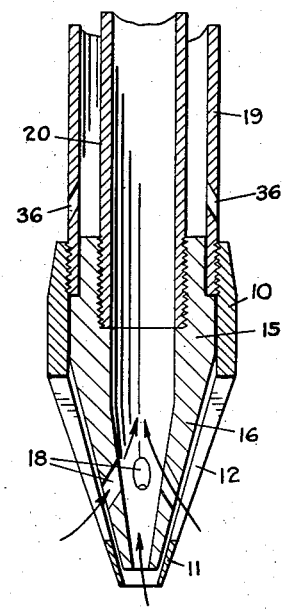
Inventor
F.C. Chew June 28, 1938.  F. C. CHEW  2,121,858
EXCAVATING AND PROSPECTING TOOL
Filed Sept. 9, 1937  2 Sheets-Sheet 2
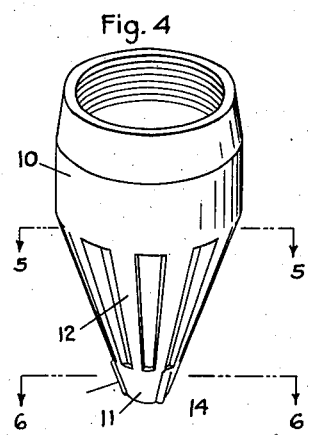
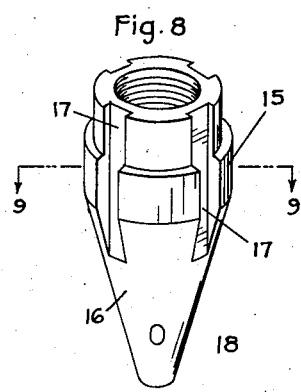
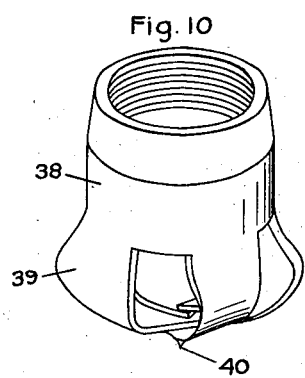
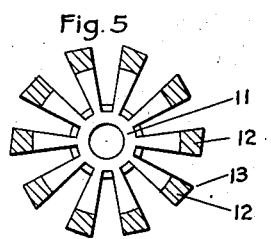
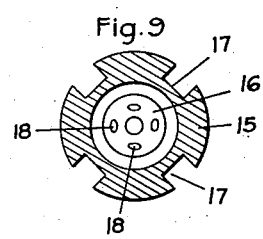
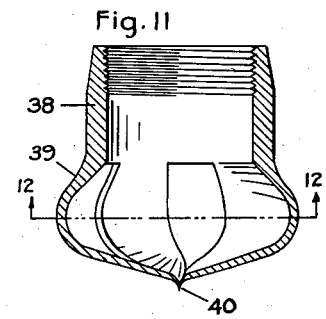
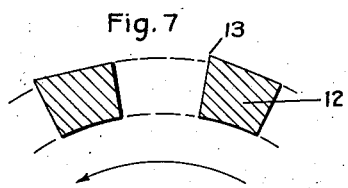
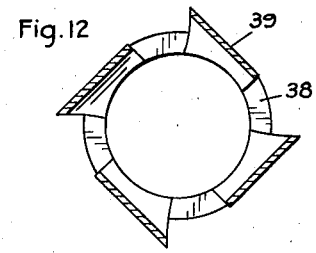
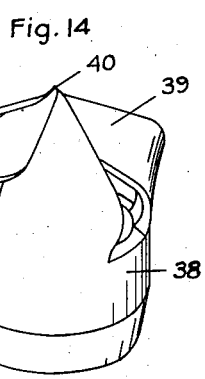
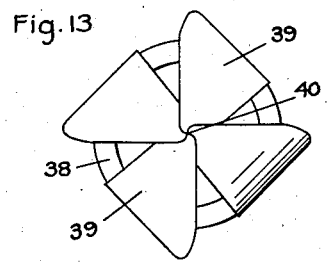
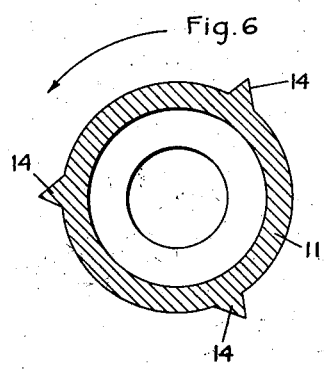
Inventor
F.C. Chew Patented June 28, 1938

2,121,858

UNITED STATES PATENT OFFICE 2,121,858

EXCAVATING AND PROSPECTING TOOL

Fred C. Chew, Grand Island, Nebr.

Application September 9, 1937, Serial No. 163,041

7 Claims. (Cl. 255—24)

My invention relates to tools which are expressly adapted to be sunk to various depths below the surface of the soil for removing soil samples at the various depths.

An important object of my invention is the provision of a tool adapted for forcing a stream of water therethrough to the bottom of the soil cavity and for simultaneously drawing the water out from the soil cavity through the tool by means of suction applied to a discharge member of the tool.

Another of my objects is the provision of a tool for the forced passage of water therethrough to the bottom of the soil cavity and the withdrawal of the water and sand under suction for clearing a path for the descent of the tool under its own weight.

Another object which I have in view is the provision of a bit having a pair of coaxial members, one of which is rotatable relatively to the other and having water passageways between the two members.

Another of my objects is the provision of a bit having inner and outer coaxial members in which the outer member is rotatable relatively to the inner member and in which both members are provided with passageways for the entrance of water and soil, the outer member also having ribs with outwardly projecting leading edges adjacent the passageways for cutting through refractory soils.

Having in view these objects and others which will be pointed out in the following description, I will now refer to the drawings, in which Figure 1 is a view in elevation of the entire tool.

Figure 2 is a view in median vertical section of a broken portion of the tool.

Figure 3 is a view similar to Figure 2 but showing more particularly the joints between the links of pipe.

Figure 4 is a perspective view of the outside member of the drill bit.

Figure 5 is a sectional view on the line 5—5 of Figure 4 and looking in the direction of the arrows.

Figure 6 is a sectional view on an enlarged scale and on the line 6—6 of Figure 4.

Figure 7 is a sectional view of a fragment of the structure shown in Figure 5 and showing particularly the inclination of the leading or cutting edges of the ribs.

Figure 8 is a perspective view of the inner member of the bit.

Figure 9 is a sectional view on the line 9—9 of Figure 8 and looking in the direction of the arrows.

Figure 10 is a view in perspective of the alternative form of bit for cutting through rock and other refractory material.

Figure 11 is a view in median vertical section through the bit shown in Figure 10.

Figure 12 is a view in transverse section on the line 12—12 of Figure 11 looking in the direction of the arrows.

Figure 13 is a bottom plan view of the same bit as seen when looking up.

Fig. 14 is a perspective view (from another angle) of the bit shown in Fig. 10.

The bit generally employed is made up of two coaxial members as shown in Figures 2 and 3 and as shown individually in Figures 4 and 8 respectively. The outward of the two bit members has a cylindrical portion 10 and a frusto-conical portion 11 depending therefrom and terminating in a tip 11. Between the cylindrical portion 10 and the tip 11 the bit member is provided with openings between the ribs 12, the ribs 12 and the tip 11 being portions of the same frustrum of a cone. The outer wall of the cylindrical portion 10 tapers slightly in an upward and inward direction as shown in Figures 2, 3 and 4 for the purpose of controlling the direction of the flow of the streams of water to more effectively utilize their cutting function. The ribs 12 are so formed that their leading edges 13 project outwardly to a slight extent as best shown in Figures 5 and 7 for the purpose of providing cutting edges which operate effectively in refractory soils. The tip 11 as shown in Figure 6 has a plurality of cutters 14 projecting therefrom, these cutters extending lengthwise of the tip and being adapted to readily enter and to cut away the soil. The cone of the tip 11 and the ribs 12 is elongated so that the slope is gradual for progressively cutting away the soil.

The inner member of the bit also has a cylindrical portion 15 which terminates in a depending frusto-conical portion 16. The cylindrical portion 15 is seated against the inner wall of the cylindrical portion 10 and is adapted to rotate therein. The portion 16 is, however, spaced from the portion 12 as shown in Figure 2, thus providing a passageway for the water. Extending lengthwise of the inner bit member is a plurality of channels 17 extending from the upper end of the bit member to the portion 16 so that the passageways for the water are continuous. The frusto-conical portion 16 terminates at a slight distance above the tip 11 as shown in Figure 2. The frusto-conical portion 16 is also provided with a plurality of upwardly and inwardly inclined apertures 18. The two bit members are adapted to rotate relatively to each other about their common axis.

The cylindrical portion 10 is internally screw threaded for receiving the lower end of a casing 19. The cylindrical portion 15 has offset external and internal shoulders for seating the ends of the casing 19 and the pipe 20, the portion 15 being internally screw threaded for securing thereto the lower end portion of the pipe 20. This provides a passageway for the water between the casing 19 and the pipe 20 so that the descending water may enter the channels 17 and pass down between the portions 12 and 16 to be discharged partly between the ribs 12 and partly between the tip 11 and the lower end of the portion 16. In practice the casing 19 is designed to be rotated with the outer bit member while the pipe 20 with the inner bit member are held relatively stationary.

The casing 19 is in the form of a plurality of lengths which are to be added to as the tool is sunk into the soil. The upper end of the upper length of the casing 19 is outwardly flanged at 21 as shown in Figure 2 and is seated in the head 22 of the tube, the head being provided with an inwardly projecting flange 23 for seating the end portion 21 of the casing 19. The head 22 is outwardly flanged at 24 to receive a flanged collar 25 which may be secured to the flange 24 by any suitable fastening means 26. Between the flange 21 and the collar 25 there is a space for receiving a suitable packing 27 for preventing the leakage of water therethrough. The casing 19 with its flange 21 is therefore rotatable relatively to the head 22. The head is also provided with an intake 28 for connection with any suitable supply of water under pressure.

The pipe 20, which is also in sectional form as shown in Figure 3, extends upwardly through the head 22 having a bearing 29 in the head 22. The head is internally screw threaded for receiving a plug 30 threaded for surrounding the pipe 20, packing 31 being employed between the bottom of the plug 30 and the top of the bearing member. In order to prevent relative rotation between the pipe 20 and the plug 30 a set screw 32 passes through the plug and against the pipe. Similarly a pin 33 passes through the wall of the head 22 and into the plug 30 for preventing relative rotation between the head and the plug.

In the use of the tool as above described, a wrench is employed which consists of a handle 34 and a clamp 35, the clamp embracing the casing 19 to which it is securely clamped. Since the head 22 is held stationary largely through the connections with the intake 28, the casing 19 may be rotated about its axis. This casing will naturally rotate the outer bit member relatively to the inner bit member. At the same time the water enters under pressure through the intake and passes downwardly through the channel between the casing and the tube until it reaches the bottom of the hole which is being sunk. While much of this water passes through the water passages 17, other portions of the water are discharged through the apertures 36 which are downwardly and outwardly inclined to discharge the water against the walls of the soil cavity to lubricate the descent of the cylindrical portion 10 of the outer bit member. The rotation of the outer bit member loosens the soil which is then sucked upwardly through the bottom opening of the bit and through the upwardly and inwardly inclined passages 18. The soil including sand and gravel will readily be carried upwardly through the pipe 20 to be discharged in any suitable place. Sometimes, however, large particles of sand or gravel are wedged against the intake ends of the apertures 18 in which case the rotation of the outer bit member will dislodge them to cause them to fall to the bottom of the soil cavity. The streams of water descending through the passageways 17 will also be forcibly thrust against any obstacles at the apertures 18 to dislodge the obstacles. It should also be noted that the pipe 20 is a suction pipe as any suitable suction device such as the pump 37 may be connected thereto at its upper extremity.

In sinking the tool through layers of soils, rock formations are sometimes encountered which are too hard for the bit usually employed. In such cases the bit must be replaced by another bit which is more suitable for cutting through rocks. The bit shown in Figures 10 and 13 inclusive is designed to replace the bit above described. This includes a cylindrical member 38 which is tapered in its upper end portion, the cylinder and taper being similar to the cylinder 10 with its taper. It is internally screw threaded for attachment to the casing 19. Depending from the cylinder 38 is a cutting tool which includes a plurality of cutting knives 39. These knives are curved from their upper to their lower ends with all of the knives meeting to form a point 40. The curve of these knives is flattened as shown in Figure 11. Each knife is tangential at the widest diameter and each knife is provided at its leading edge with a sharpened cutting bevel. It should also be noted that the cutting edge in each knife at the widest diameter of the tool is at a greater distance from the center than the rear edge of the knife. It is, of course, my object to make this bit of the hardest material available to withstand the rough usage to which it must be subjected. The material ground away from the rock will pass behind the blades and into the path of the stream of water through the suction pipe 20. The water lubrication facilitates drilling through rock as the water is forced out through apertures 36 against the outer sides of the blades 39.

The tool as above described is designed primarily for removing soil samples at various depths of the soil for the purpose of assaying the samples to determine the ore content. It is obvious, however, that other important uses may be found. The soil samples at various depths may be taken for the purpose of determining the character of the soil as in geological exploration. The tool is also admirably adapted for sinking wells expeditiously and at low cost. In the sinking of wells the tool is first manipulated until the upper extremity of the lengths 19 or 20 approaches the level of the soil surface at which point additional lengths 19 or 20 or both are added for the further sinking of the tool into the soil. For this purpose I provide screw threaded collars 41 and 42 so that the tool as a whole may be sunk to any desired depth.

Having thus described my invention in such full, clear, and exact terms that its construction and operation will be readily understood by others skilled in the art to which it pertains, what I claim as new and desire to secure by Letters Patent of United States is:

1. In combination, a pipe and means for holding said pipe against rotation, a casing surrounding said pipe and spaced therefrom, said casing being rotatable about said pipe, a cutting bit at the lower extremity of said casing, said cutting bit being frustoconical and having an opening in the lower extremity thereof, a plurality of spaced apart cutting ribs at the sides of said cutting bit and having slotted apertures therebetween, a second bit member at the lower extremity of said pipe and seated within said cutting bit and terminating above the lower extremity of said cutting bit, said cutting bit being rotatable about said second bit member, means for forcing water downwardly through the space between said casing and said pipe, and suction means for drawing the water and suspended soil particles from beneath said second bit member upwardly through said pipe.

2. In combination, a rotatable tubular casing and a non-rotatable pipe inside thereof, the walls of said casing and said pipe being coaxial and spaced apart to provide an annular passageway therebetween, a frustoconical cutting bit at the lower extremity of said casing, said casing having downwardly and outwardly inclined conduits extending through the walls thereof immediately above said cutting bit, the lower extremity of said cutting bit having a circular aperture surrounded by a cutting edge, spaced apart cutting ribs extending lengthwise of said cutting bit, a second bit member secured to said pipe and having a bearing in said cutting bit and having its lower extremity positioned above the lower extremity of said cutting bit, means for forcing water downwardly through the annular passageway between said casing and said pipe, and suction means for drawing the water and soil particles from the space between the lower extremities of said two bit members and upwardly through said pipe.

3. In combination, a rotatable tubular casing and a non-rotatable pipe inside thereof, the walls of said casing and said pipe being coaxial and spaced apart, a cutting bit secured to said casing at the lower extremity thereof, said cutting bit and the lower portion of said casing being each provided with openings for the discharge of water from the space between said casing and said pipe, said cutting bit having cutting edges adjacent the openings thereof, a second bit member secured to said pipe and seated within said cutting bit whereby the rotation of said casing will cause the rotation of said cutting bit about said second bit member, said second bit being provided with inwardly and upwardly inclined apertures for receiving water from the soil cavity, means for forcing a stream of water downwardly through the annular space betwen said casing and said pipe, and suction means for drawing the water from the bottom of the soil cavity upwardly through said pipe.

4. In combination, a tubular casing and a pipe inside thereof, the walls of said casing and said pipe being coaxial and spaced apart to provide an annular passageway therebetween, a frustoconical cutting bit depending from said casing, a second bit member depending from said pipe and seated within said cutting bit and having its lower extremity positioned above the lower extremity of said cutting bit, said cutting bit having a plurality of spaced apart cutting ribs with slots therebetween, grooved channels in said second bit member extending from the annular passageway between said casing and said pipe to the slots between said ribs, means for rotating said casing about said pipe, means for forcing water downwardly in the annular space between said casing and said pipe, and suction means for drawing the water and suspended soil particles from beneath said second bit member upwardly through said pipe.

5. In combination, a pipe and means for holding said pipe against rotation, a casing surrounding said pipe and spaced therefrom, said casing being rotatable about said pipe, a cutting bit at the lower extremity of said casing, said cutting bit being frustoconical and having an opening in the lower extremity thereof and being provided with a plurality of spaced apart slotted openings, the lower end portion of said cutting bit having a circular cutting edge and a plurality of ribs projecting radially therefrom, a second bit member at the lower extremity of said pipe and seated within said cutting bit and terminating above the lower extremity of said cutting bit, said cutting bit being rotatable about said second bit member, means for forcing water downwardly through the space between said casing and said pipe, and suction means for drawing the water and suspended soil particles from beneath said second bit member upwardly through said pipe.

6. In a device for recovering soil samples at various depths, a head adapted to be held against rotation, a casing secured at its upper extremity in said head for rotation therein, a pipe extending through said head and through said casing, said pipe being coaxial with said casing and spaced therefrom to provide an annular conduit between said casing and said pipe, a frustoconical cutting bit depending from said casing, a second bit member depending from said pipe and seated within said cutting bit and having its lower extremity positioned above the lower extremity of said cutting bit, said cutting bit having a plurality of spaced apart cutting ribs with slots therebetween, grooved channels in said second bit member extending from the annular passageway between said casing and said pipe to the slots between said ribs, means for rotating said casing about said pipe, means for forcing water downwardly in the annular space between said casing and said pipe, and suction means for drawing the water and suspended soil particles from beneath said second bit member upwardly through said pipe.

7. In a device for recovering soil samples at various depths, a head adapted to be held against rotation, a casing secured at its upper extremity to said head for rotation relatively thereto, a pipe extending through said head and through said casing, means between said head and said pipe for preventing rotation of said pipe, said pipe being coaxial with said casing and spaced therefrom to provide an annular conduit between said casing and said pipe communicating with the interior of said head, means for conducting water under pressure into said head, a frustoconical cutting bit depending from said casing, a second bit member depending from said pipe and seated within said cutting bit and having its lower extremity positioned above the lower extremity of said cutting bit, said cutting bit having a plurality of spaced apart cutting ribs with slots therebetween, grooved channels in said second bit member extending from the annular passageway between said casing and said pipe to the slots between said ribs, means for rotating said casing about said pipe, means for conducting the water from said head downwardly in the annular space between said casing and said pipe, and suction means for drawing the water and suspended soil particles from beneath said second bit member upwardly through said pipe.

FRED C. CHEW.